Figure 2B:
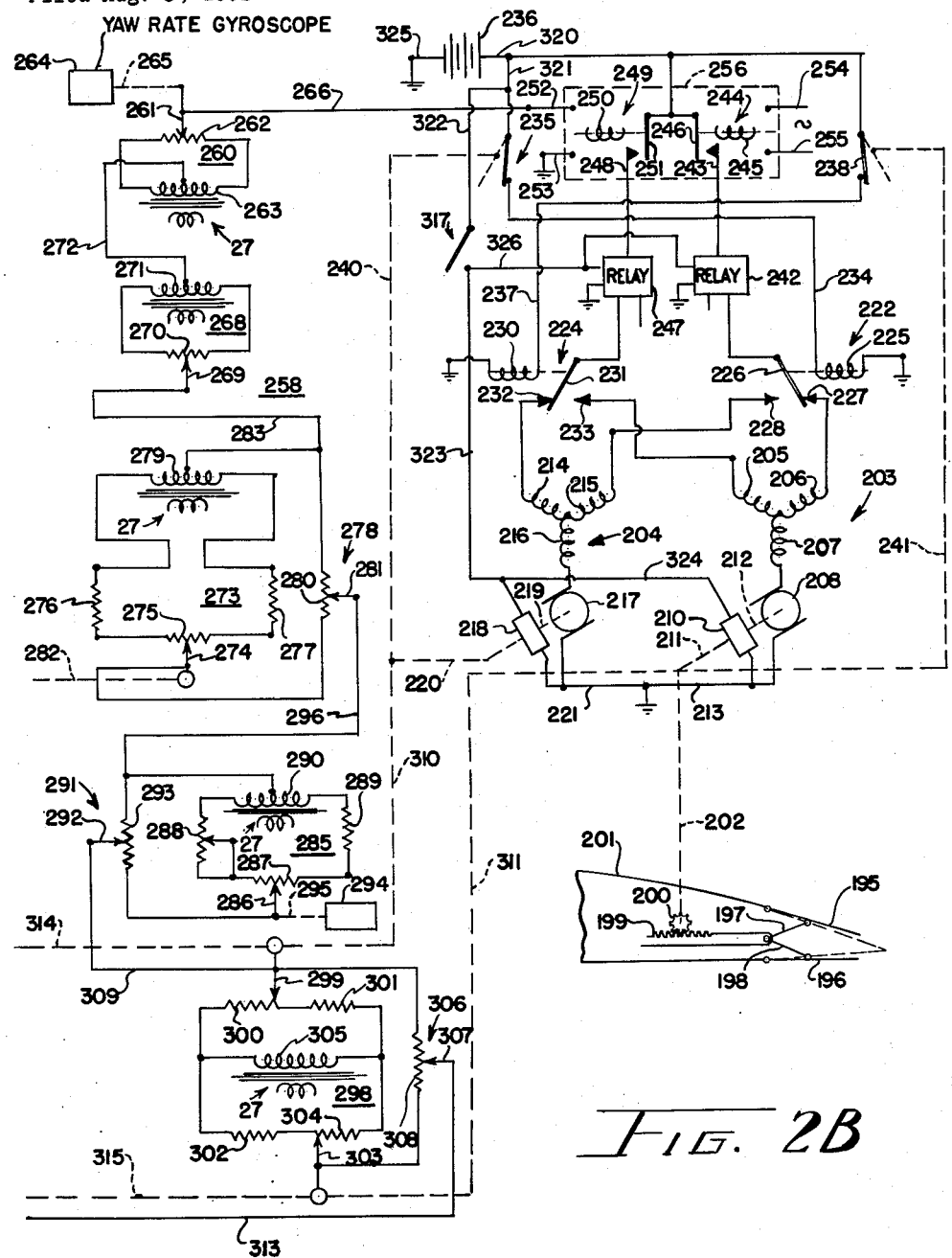

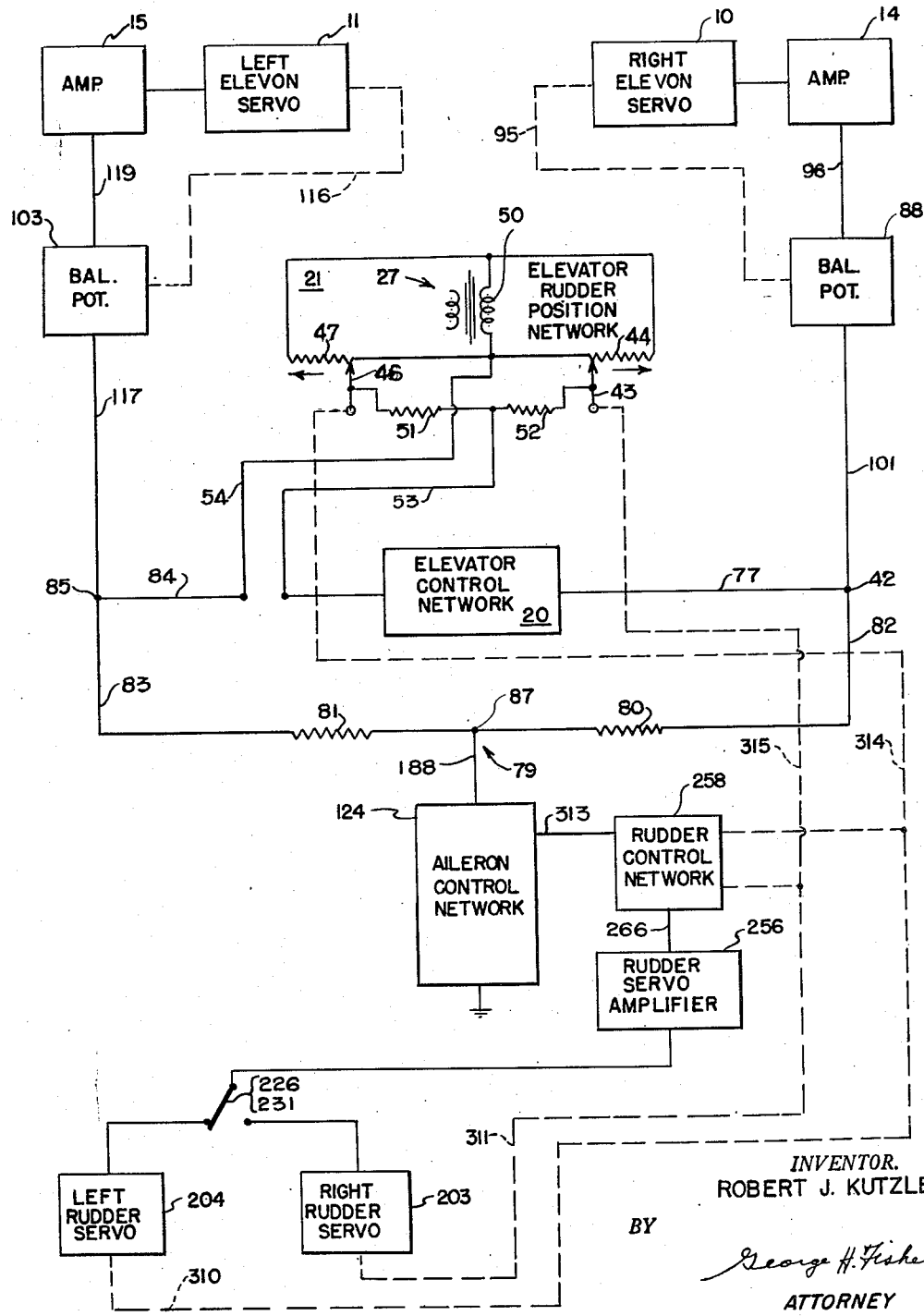

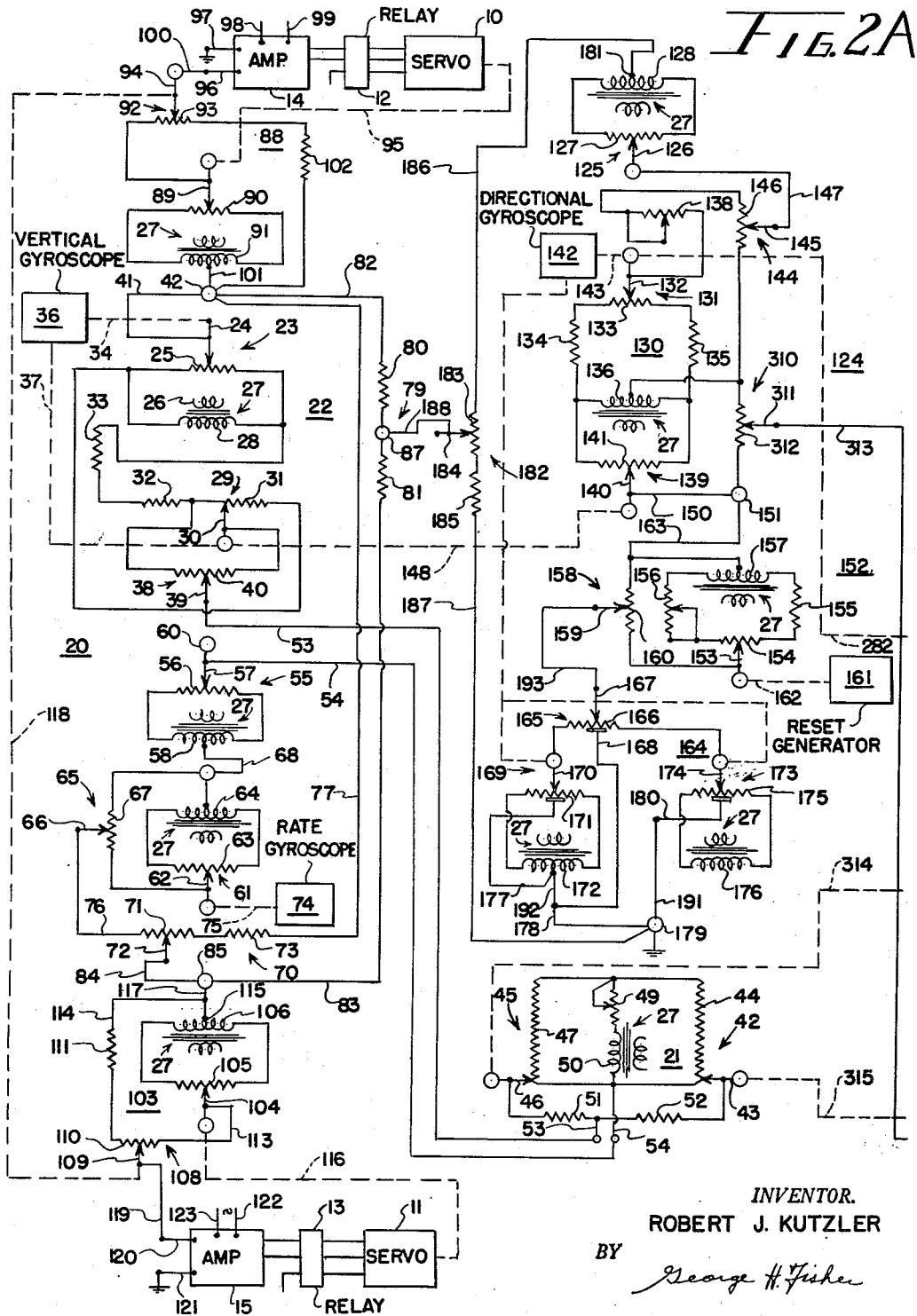

INVENTOR.
ROBERT J. KUTZLER
BY George H. Fisher
ATTORNEY

Patented July 6, 1954

2,683,003

UNITED STATES PATENT OFFICE 2,683,003

STEERING MECHANISM

Robert J. Kutzler, St. Louis Park, Minn., assignor to Minneapolis-Honeywell Regulator Company, Minneapolis, Minn., a corporation of Delaware Application August 8, 1951, Serial No. 240,864

11 Claims. (Cl. 244—77)

This invention relates to steering mechanisms for dirigible craft and more particularly pertains to automatic pilots for aircraft of the Flying Wing type having a pair of elevons and a pair of rudders arranged in the trailing edge of the wings of the craft. An elevon is arranged in the trailing edge as stated of the left and right wings of the aircraft, and both elevons are operable together. In one manner of operation, both elevons may be moved about their supporting axis in the same direction to act as elevators and on the other hand may be operated in another manner so that they are rotated about their supporting axis in opposite directions to act as ailerons. The left and the right wings of the aircraft also have separately mounted therein a rudder. Each rudder consists of two portions hinged together and when operated, these portions project respectively above and below the trailing edge of the wing. In unoperated position, the two portions assume the contour of the wing with their free ends substantially aligned with the trailing edge of the wing.

This invention is an improvement over my prior application Serial No. 212,345 of February 23, 1951, for Automatic Pilots primarily adapted for a Flying Wing aircraft.

In my aforesaid application, briefly, the elevons are operated in opposite directions and one or another of the rudders is operated to place said aircraft in a banked turn. As a result of the banking of the aircraft, an up elevon signal is provided by the vertical gyroscope to move both elevons upwardly in the same direction to prevent loss of altitude of the aircraft during said turn. The amount of control surface displacement of either elevon or rudder is limited by a follow up drive from the servomotor operating such surface. While the aircraft was making an entry into such turn, it was discovered that the aircraft had its attitude changed about the pitch axis beyond that desired and in such a direction as to cause it to increase in altitude. This effect apparently was due to the displaced rudder. The rudder while structurally having two portions symmetrically positioned relative to the trailing edge of the aircraft for the purpose solely of increasing the drag of its wing when operated did not derive equal effects from both portions. Actually the upper portion apparently provides a greater effect than the lower portion which would account for the tendency of the craft to nose upwardly beyond the amount desired during entry into turns.

The vertical gyro as stated provided an up elevon signal upon tilt of the craft about the roll axis. This signal tended in itself to increase the attitude of the plane causing it to nose upward. Seemingly, this up elevon signal could be varied or reduced during entry into turns to overcome the effect of the upward change in attitude of the craft due to the displaced rudder. However, rather than modify such control effect from the vertical gyroscope, I propose to secure the modifying effect from a separate source which is effective during entry into turns, such entry being considered the portion of the turn in which the rudder moves to its operated position and returns to its unoperated position which is then succeeded by the steady state portion of the turn.

It is an object therefore of this invention to provide a Flying Wing aircraft having elevon and rudder control surfaces arranged in the wings with a device responsive to operation of a rudder as a consequence of placing said aircraft in a banked turn and for causing operation of said elevons from said device downwardly in the same direction in proportion to the extent of rudder operation.

It is a further object of this invention to operate the rudder and elevon control surfaces arranged in the wings of a Flying Wing aircraft initially to cause a banked turn of the craft and to cause further operation of said elevons in the same direction in response to operation of said rudder previously.

It is a further object of this invention to operate the elevons arranged in the wings of a Flying Wing type of aircraft so that they operate in the same direction and in accordance with the difference of the angle of bank of the aircraft and the amount of rudder displacement.

It is a further object of this invention to operate the elevons of a Flying Wing type of aircraft, which have a moment about the roll and pitch axes of the craft, and the rudder, having a moment about the vertical and pitch axes of the aircraft, to set up a desired rate of turn by moving one rudder of said craft and adjusting said elevon control surfaces in opposite directions and thereafter in response to the position of said rudder and to the bank angle of said craft due to operation of said elevons to cause operation of said elevon control surfaces in the same direction.

It is a further object of this invention to provide a Flying Wing type of aircraft having elevon and rudder control surfaces arranged in the wings with a control signal derived from the bank attitude of the craft during a turn to cause both said elevons to move in an upward direction and to modify said signal during entry into the turn in accordance with the position of the rudder of said craft.

It is a further object of this invention to provide a Flying Wing aircraft having elevon and rudder control surfaces arranged in the wings with a signal tending to operate both elevons in a downward direction in accordance with the displacement of said rudder which has been positioned to effect an entry or a recovery from a turn.

The above and further objects of the invention will become more apparent hereinafter upon consideration of the following detailed description in conjunction with the accompanying drawings showing a preferred embodiment thereof.

In the drawings:

Figure 1 shows the functional relationship of various control networks for the servomotors that operate the elevons and rudders of the aircraft;

Figures 2a and 2b together constitute a schematic arrangement of the control system for a Flying Wing aircraft.

Referring to Figure 1, for the general aspects of the invention, a right elevon servomotor 10 and a left elevon servomotor 11 operate their respective elevons (not shown) of a Flying Wing type of aircraft. The right elevon servomotor is reversibly controlled from an A. C. discriminator amplifier 14. The left elevon servomotor 11 is reversibly controlled by a similar A. C. discriminator amplifier 15. The elevons, as stated, may be operated together in the same direction so as to apply a moment about the pitch axis of the aircraft so that they function similar to conventional elevators. Control voltage signals for the amplifiers for providing this elevator function are derived from a control network 20 and a rudder position network 21. The control signals from networks 20, 21 are connected in series and applied across a fixed voltage divider 79. The midpoint 87 of this fixed voltage divider 79 is connected to ground through an aileron control network 124. It is evident that the phase of the control signal across one-half of the fixed voltage divider 79 is of opposite phase to that across the other half of the fixed voltage divider. The signals of equal but opposite phase are applied to amplifiers 14 and 15 through the respective rebalance potentiometer networks 88 and 103. These signals on amplifiers 14 and 15 result in the operation of the right and left elevon servomotors 10 and 11 so that the elevons are moved in the same direction. A follow-up connection from the elevon servomotors 10 and 11 to their respective rebalance potentiometer networks 88 and 103 provide a rebalancing signal to the respective input signals.

The elevons are also operable in opposite directions so that they cause the aircraft to bank. Control signals for this operation of the elevons is obtained from the aileron control network 124. A control signal from this aileron network 124 is applied equally to both amplifiers 14 and 15 and this control signal being of the same phase causes the amplifiers to operate their respective servomotors 10 and 11 in the opposite directions similar to the operation of the conventional ailerons. A control signal from the aileron control network 124 to amplifiers 14, 15 is balanced by the elevon servomotor in each case operating its balance potentiometer network 88 or 103.

Control of the aircraft about its vertical axis is provided by left and right rudders which are respectively operated by left rudder servomotor 204 and a right rudder servomotor 203. One or the other rudder servomotor is alternatively controlled from a rudder servo amplifier 256. Thus rudder servo amplifier is of the A. C. discriminator type and derives its control signal voltages from a rudder control network 258 and a portion of the aileron control network 124. Rebalance of the control network 258 to the rudder servo amplifier 256 is provided by a sub network 298 therein (shown in detail in Figure 2B) by follow-up connections 310, 311 extending from the left rudder servomotor 204 and the right rudder servomotor 203.

Rudder position signals are provided in elevator control network 21 by follow-up drives (310, 314) (311, 315) extending from the left rudder servomotor 204 and the right rudder servomotor 203 to operate network 21.

For a fuller appreciation of the manner in which control signal voltages are derived, reference is made to the following detailed description. Referring to Figure 2a, the right elevon servomotor 10 is controlled from its amplifier 14 through automatic steering engage relay 12. The relay when energized serves to electrically connect the amplifier to the servomotor for control of the latter. Similarly the left elevon servomotor 11 is controlled by its amplifier 15 through an engage relay 13. Amplifier 14 is provided with power input connections 98, 99 connected to a standard source of alternating voltage and signal input terminals 96, 97 which are connected to the control signal voltage networks from which is derived a control signal. The direction of rotation of servomotor 10 depends upon the phase relationship of the control signals across terminals 96, 97 with respect to the alternating power voltage across terminals 98, 99.

Control signals for elevator operation of the elevons is as stated obtained from networks 20, 21. Network 20 comprises a pitch attitude-craft bank-up elevator signal generator 22; a bank trim generator 55; and a pitch rate generator 61. Generator 22 comprises a potentiometer 23 having a slider 24 and a resistor 25; a transformer 27 having a primary winding 26 and a secondary winding 28; an up-elevator potentiometer 29 having a slider 30 and a resistor 31, a fixed resistor 32; a fixed resistor 33; and a voltage dividing potentiometer 38 comprising a slider 39 and a resistor 40. Resistor 25 is connected across the secondary winding 28. Resistor 31 has one end connected through resistors 32 and 33 in series to one end of secondary winding 28. The opposite end of resistor 31 is connected to the remaining end of secondary winding 28. Resistor 40 of the voltage divider potentiometer 38 has one end connected to the junction of resistors 31, 32 and its opposite end connected to slider 39 of up-elevator potentiometer 29. Slider 24 is positioned from the electrical center of resistor 25 in either direction in accordance with the direction of craft pitch and in an amount depending upon the magnitude of pitch of the aircraft. This positioning is effected by a suitable operating connection 34 extending from a vertical gyroscope 36 to slider 24.

The vertical gyroscope is of the type well known in the art having its rotor mounted within a casing with its spin axis vertical, and the casing supporting the rotor in turn is mounted in cross gimbals having axes horizontal but perpendicular to one another. The arrangement is such that upon movement of the craft about its pitch axis, slider 24 is positioned relative to resistor 25.

The slider 30 of the up-elevator potentiometer 29 is positioned from the vertical gyroscope 36 through a suitable operating connection 37 in accordance with the bank attitude of the aircraft. The operating arrangement between slider 30 and the vertical gyroscope 36 is such that upon tilt of the craft about the longitudinal axis the movement of slider 30 is in the same direction irrespective of the direction of tilt of the aircraft. A conductor 41 extends from slider 24 to a junction 42. Slider 39 of potentiometer 38 may be manually adjusted along resistor 40 and once adjusted is generally so maintained.

Progressing to network 21, this network comprises a right rudder position potentiometer 42 comprising a slider 43 and a resistor 44; a left rudder position potentiometer 45 comprising a slider 46 and a resistor 47; a variable resistor 49; a secondary winding 50 of transformer 27; and two equal fixed resistors 51, 52. Resistor 47 has one end directly connected to an end of secondary winding 50 and its opposite end connected in series with variable resistor 49 to the opposite end of secondary winding 50. Resistor 44 has one end directly connected to an end of secondary winding 50 and its opposite end connected through the variable resistor 49 to the opposite end of secondary winding 50. Resistors 51 and 52 are connected in series and the remaining end of resistor 51 is connected to slider 46 whereas the remaining end of resistor 52 is connected to slider 43. Sliders 43 and 46 are positioned along their respective resistors from one extremity thereof, illustrated, in accordance with the operation of their respective rudder servomotors in a manner to be described. A conductor 53 extends from the junction of resistors 51 and 52 to slider 39 of the voltage dividing potentiometer 38.

Reverting to network 20, trim signal generator 55 comprises a potentiometer having a resistor 56 and a slider 57 with the generator additionally including a secondary winding 58 of transformer 27. The secondary windings of the various networks as may have been inferred may be part of the same transformer 27 having a single primary winding 26. Resistor 56 is connected across the secondary winding 58. Slider 57 is positioned along resistor 56 by a manually operable knob 60. A conductor 54 extends from slider 57 to the junction of resistors 47, 44 with secondary winding 50.

Network 20 lastly includes a pitch rate signal generator comprising a potentiometer 61 having a slider 62 and a resistor 63; a secondary winding 64 of transformer 27; and a voltage dividing potentiometer 65 having a slider 66 and a resistor 67. Resistor 63 is connected across the secondary winding 64. One end of resistor 67 is connected to a center tap of secondary winding 64 and the opposite end of the resistor is connected to slider 62. A conductor 68 extends from the center tap of secondary winding 64 to a center tap of secondary winding 58 of the trim signal generator 55. Slider 62 is positioned along resistor 63 in either direction from the center thereof by a pitch rate gyroscope 74. This operation is effected through a suitable operating connection 75. The gyroscope 74 is of a conventional type with the rotor freely rotatable about its spin axis but whose rotation about its precession axis which is at right angles to its spin axis is restrained by suitable means, such as springs. The arrangement is such that upon the craft tilting about its pitch axis the slider 62 is moved relative to resistor 63 in a direction depending upon the direction of craft tilt and a distance depending upon the rate of tilt.

It will be evident that terminal 42 and slider 66 are the output terminals of the series connected networks 20, 21. Across these two output terminals is connected a voltage divider 70 comprising a potentiometer having a resistor 71 and a slider 72 with the voltage divider additionally comprising a fixed resistor 73. Resistors 71 and 73 are connected in series and a conductor 76 extends from the remaining end of resistor 71 to slider 66, and a conductor 77 extends from the remaining end of resistor 73 to terminal 42. Slider 72 is adjusted along resistor 71 in accordance with the proportion of the voltage set up in networks 20, 21 which it is desired to select.

A conductor 84 extends from slider 72 to terminal 85. A fixed voltage divider 79 is connected across the terminals 42, 85. The voltage divider comprises two fixed resistors 80, 81 of equal electrical resistance. Resistors 80, 81 are connected in series and the remaining end of resistor 80 is connected by conductor 82 to terminal 42 whereas the remaining end of resistor 81 is connected by conductor 83 to terminal 85. Thus the voltage selected by voltage divider 70 is applied across the fixed voltage divider 79, and it is evident that the voltage or potential difference between junction or terminal 87 of resistors 80, 81 and terminal 42 is opposite that between terminals 87 and 85. The voltage between terminal 87 and terminal 42 is in series with an elevon servo rebalance network 88. Network 88 comprises a follow-up potentiometer having a slider 89 and a resistor 90; a voltage dividing potentiometer 92 having a resistor 93 and a slider 94; a fixed resistor 102; and a secondary winding 91 of transformer 27. Resistor 90 is connected across the secondary winding 91. Resistors 93 and 102 are connected in series. The remaining end of resistor 93 is connected to slider 89 whereas the remaining end of resistor 102 is connected to terminal 42. A conductor 101 extends from a center tap of secondary winding 91 to terminal 42. Slider 89 is positioned along resistor 90 in accordance with the movement of the right elevon servomotor 10 by a suitable follow-up connection 95. A conductor 100 extends from slider 94 to signal input terminal 96 of amplifier 14. The remaining control signal input terminal 97 of amplifier 14 is connected to ground.

The signal between terminal 87 and terminal 85 is applied in series with a left elevon rebalance signal generator 103 to amplifier 15. Signal generator 103 comprises a folow-up potentiometer having a slider 104 and a resistor 105; a secondary winding 106 of transformer 27; a voltage dividing potentiometer 108 having a slider 109 and resistor 110; and a fixed resistor 111. Resistor 105 is connected across the secondary winding 106. Resistors 110, 111 are connected in series and the remaining end of resistor 110 is connected by conductor 113 to slider 104 whereas the remaining end of resistor 111 is connected by conductor 114 to a center tap 115 of secondary winding 106. A conductor 117 extends from the center tap 115 to terminal 85. Slider 104 is positioned along resistor 105 in accordance with operation of the left elevon servomotor 11 by means of a suitable operating connection 116 whereas slider 109 is manually adjusted along resistor 110. A conductor 119 extends from slider 109 to a signal input connection 120 of amplifier 15. The other signal input connection 121 is connected to ground.

Amplifier 15 additionally includes power input connections 122, 123 connected to a suitable source of alternating voltage. Sliders 94 and 109 are adjusted along their resistors 93, 110 concomitantly by a suitable operating connection 118.

Continuing to the remainder of the structure, aileron control network 124 comprises a bank trim signal generator 125, a craft heading-craft bank attitude signal generator 130, a heading reset signal generator 152, and a manually operable turn control signal generator 164. Trim signal generator 125 comprises a potentiometer having a slider 126 and a resistor 127 with the resistor 127 connected across the ends of a secondary winding 128 of transformer 27. Slider 126 may be manually adjusted along resistor 127 in either direction from the normally centered position.

Craft heading-craft bank attitude generator 130 comprises a heading potentiometer 131 having a slider 132 and a resistor 133; two fixed resistors 134, 135; a secondary winding 136 of transformer 27; a bank attitude potentiometer 139 having a slider 140 and resistor 141; a variable resistor 138; and a voltage dividing potentiometer 144 having a slider 145 and a resistor 146. One end of resistor 133 is connected in series with resistor 134 to one end of secondary winding 136 and the opposite end of resistor 133 is connected in series with resistor 135 to the other end of secondary winding 136. Variable resistor 138 and resistor 146 of voltage divider 144 are connected in series and the remaining end of resistor 138 is connected to slider 132 and the remaining end of resistor 146 is connected to a center tap of secondary winding 136. A conductor 147 extends from slider 145 of voltage divider 144 to slider 126 of the bank trim generator 125. Resistor 141 is connected across the secondary winding 136. Slider 132 is positioned along resistor 133 from a directional gyroscope 142 by a suitable operating connection 143.

The directional gyroscope 142 is a heading responsive device and is of the type well known in the art having a rotor with a horizontal spin axis carried in a casing. The casing in turn is trunnioned about a horizontal axis at right angles to the rotor spin axis in an outer gimbal ring. This gimbal ring in turn is rotatable about a vertical axis so that upon change in heading of the craft the slider 132 moves along resistor 133 in a direction dependent upon the direction of change in heading and in an amount depending upon the extent of change of heading. The directional gyroscope 142 is provided with suitable conventional means 149, generally illustrated, effective during manual changes of heading through the autopilot to prevent operation of slider 132 by the directional gyroscope 142. As this means forms no part of this invention the details thereof are omitted. The slider 140 of the bank attitude potentiometer 139 is positioned along resistor 141 by vertical gyroscope 36 through the suitable operating means 37, 148 in accordance with the direction and magnitude of bank of the aircraft. A conductor 150 extends from slider 140 to a terminal 151.

Heading reset generator 152 comprises a potentiometer having a slider 153 and a resistor 154; a fixed resistor 155; a variable resistor 156; a secondary winding 157 of transformer 27, and a voltage dividing potentiometer 158 having a slider 159 and a resistor 160. One end of resistor 154 is connected through variable resistor 156 to one end of secondary winding 157 and the opposite end of resistor 154 is connected through fixed resistor 155 to the other end of secondary winding 157. Resistor 160 is connected across slider 153 and a center tap of secondary winding 157. A conductor 163 extends from the center tap of secondary winding 157 to terminal 151. Slider 153 is positioned along resistor 154 by a heading reset signal generator 161 through a suitable operating connection 162. The details of the heading reset generator 161 since they form no part of the present invention and are unnecessary to an understanding of the present invention are omitted. They may be obtained, if desirable, from my aforesaid prior application. The reset generator insures that the craft will regain the stabilized heading.

Manual turn control signal generator 164 comprises a fader potentiometer 165, a pilot's potentiometer 169, and a co-pilot's potentiometer 173. Potentiometer 169 includes a slider 170 and resistor 171 with the latter connected across a secondary winding 172 of transformer 27. Potentiometer 173 includes a slider 174 and a resistor 175 with the resistor 175 connected across a secondary winding 176 of transformer 27. The fader potentiometer 165 includes a slider 167 and resistor 166 with the resistor being connected across sliders 170, 174. Extending from a center tap of resistor 166 are series connected conductors 168, 178 with the latter being connected to a ground terminal 179. A conductor 177 extends from a center tap of resistor 171 to a center tap of secondary winding 172. Conductor 192 extends from the center tap of secondary winding 172 to ground conductor 178. A conductor 180 extends from a center tap of resistor 175 of the co-pilot's potentiometer 173 through a series connected conductor 191 to ground terminal 179. It is thus evident that the left portion of resistor 166 of fader potentiometer 165 serves as a voltage divider across the pilot's potentiometer 169 whereas the right portion of the resistor 166 beyond its center tap forms a voltage divider for the co-pilot's potentiometer 173. A conductor 193 extends backward from slider 167 of the fader potentiometer 165 to the adjustable slider 159 of voltage divider 158. The signal generators of the network 124 which are thus connected in series develop an output voltage, when adjusted, between the ground terminal 179 and a center tap 181 of secondary winding 128 of the bank trim generator 125. A voltage divider 182 is connected across the terminals 179 and center tap 181. This voltage divider comprises a potentiometer resistor 183, its coacting slider 184 and additionally includes a fixed resistor 185. Resistors 183 and 185 are connected in series and the remaining end of resistor 183 is connected by conductor 186 to center tap 181 whereas the opposite end of resistor 185 is connected by conductor 187 to ground terminal 179. A conductor 188 extends from slider 184 to terminal 87 in the elevator network 20.

It is now apparent that with no signal voltage generated in network 124 that there will be no voltage across voltage divider 182. Consequently, terminal 87 is at the same potential as ground terminal 179. Thus any signal in network 20 will result, as stated, in a voltage between terminals 42 and terminal 87 which is opposite in phase to the voltage between terminal 65 and terminal 87 with the latter now being at ground potential and thus common to the ground terminals 97 and 121 of amplifiers 14 and 15. Thus in all subsequent operations the amplifiers 14 and 15 may receive control signals either from network 20 alone or network 20 in combination with network 124 or from the latter along with the network terminal 179 serving as a ground for both networks.

The rudder control apparatus is mainly illustrated in Figure 2B. In this figure, a rear portion of one wing is shown in section. This portion includes a rudder having the upper portion 195 and lower portion 196 which in dotted position assume the contour of the wing but when operated (full line position) move outwardly from the top and bottom portions of the wing. Operating links 197 and 198 extend from the wing portions 195 and 196 to a common pivot on rack bar 199. Rack bar 199 is longitudinally operated by a pinion 200 carried by a drive shaft 202.

For positioning the rudder members 195 and 196 there is provided a right rudder servomotor 203. The motor 203 is a reversible D. C. series motor and comprises field windings 205, 206; a pulsing clutch winding 207; armature 208; motor drive shaft 212; magnetic clutch 210; and output shaft 211 connected to drive shaft 202. Pulsing clutch solenoid 207 has one end connected to a junction of field windings 205, 206 and its opposite end is connected in series with armature 208 to a ground conductor 213. The magnetic clutch 210 is interposed the drive shaft 212 and output shaft 211 so that with the clutch energized the drive shaft 212 and output shaft 211 are operatively connected.

Arrangement of the pulsing clutch and its winding 207 is such that with the motor energized, the motor operates the output shaft 211 without a brake being applied thereto. However, with the motor deenergized a brake is applied to the output shaft 211 so that it is held against movement until the motor is again energized. The motor pulsing clutch-brake arrangement is well known in the art. (See the patent to Lear 2,267,114.)

The left rudder (not shown) is positioned by a servomotor 204 similar to motor 203 and having motor windings 214, 215; pulsing clutch winding 216; motor armature 217; drive shaft 219; magnetic clutch 218; and output shaft 220. One end of pulsing clutch winding 216 is connected to a common junction of windings 214, 215 and the other end of pulsing clutch winding 216 is connected in series with the armature 217 to a ground conductor 221.

Motors 203, 204 are reversibly controlled by relays 222, 224. These relays are of the single pole double throw type. Relay 222 comprises an operating coil 225, an operable arm 226 positioned between an out contact 227 and an in contact 228. Relay 224 comprises an operating coil 230 for moving an arm 231 positioned between out contact 232 and in contact 233. Motor winding 205 is connected to in contact 233 and motor winding 206 is connected to out contact 227 of relay 222. Winding 214 of motor 204 is connected to in contact 232 of relay 224 and winding 215 is connected to out contact 228 of relay 222. One end of operating coil 225 of relay 222 is connected to ground. A conductor 234 extends from the other end of coil 225 through a normally closed single pole single throw switch 235 to a source of D. C. voltage such as battery 236. Operating coil 230 of relay 224 has one end connected to ground and its other end connected by conductor 237 and a normally closed single pole single throw switch 238 to D. C. source 236.

The switches 235 and 238 are operated by the left and right rudders respectively. As the rudder of the respective switch moves to closed position, such switch is closed but upon movement of the rudder to open position, its corresponding switch moves to open position. A suitable operating connection 240 is therefore provided between the shaft 220 of servomotor 204 and the switch arm of switch 235 and a similar operating connection 241 is provided between the drive shaft 202 and the switch arm of switch 238.

Arm 226 of relay 222 is connected through a rudder engage relay 242 to an in contact 243 of an amplifier relay 244. Relay 244 includes an operating coil 245 and an operable arm 246. Arm 246 is connected to a source of D. C. voltage 236. Arm 231 of relay 224 is connected through a second rudder engage relay 247 to an in contact 248 of an amplifier relay 249. Relay 249 includes an operating coil 250 for an arm 251. Arm 251 is connected to the source of D. C. voltage 236.

Relays 244 and 249 are part of a discriminator type amplifier having A. C. control signal voltage input connections 252, 253, and A. C. power input connections 254, 255. The amplifier functions to operate one or the other of relays 244, 249 depending upon the phase relationship of the control voltage across connections 252, 253 with respect to the voltage from the power source supplied to connections 254, 255. A suitable form of amplifier is disclosed in Patent 2,425,734 dated August 19, 1947, to Willis H. Gille et al. The form of amplifier and servomotor used for operating the rudders is also suitable for operating the elevons of the aircraft. Control signals across amplifier input connections 252, 253 are provided by a rudder control network 258 and a portion of the aileron control network 124. Network 258 comprises a yaw rate signal generator 260, a trim signal generator 268, a heading stabilizing signal generator 273, a yaw reset signal generator 285, and a rebalancing signal generator 298.

Signal generator 260 consists of a potentiometer having a slider 261 and a resistor 262 which resistor is connected across a secondary winding 263 of transformer 27. Slider 261 is positioned along resistor 262 in either direction from its midpoint by a yaw rate gyroscope 264, the movement being effected through a suitable operating connection 265. The yaw rate gyroscope is of the two degree of angular freedom type with movement of the rotor about one axis being restrained so that the slider 261 is moved relative to resistor 262 in accordance with the rate of change of heading of the craft. A conductor 266 extends from input connection 252 of amplifier 256 to slider 261.

Signal generator 268 consists of a potentiometer having a slider 269 and a resistor 270 with the resistor connected across a secondary winding 271 of transformer 27. A conductor 272 extends from a center tap of secondary winding 271 to a center tap of secondary winding 263. Slider 269 may be manually positioned along resistor 270.

Signal generator 273 comprises a potentiometer having a slider 274 and a resistor 275; fixed resistors 276, 277; a secondary winding 279 of transformer 27; and a voltage dividing potentiometer 278 having a resistor 280 and a slider 281. One end of resistor 275 is connected in series with resistor 276 to one end of secondary winding 279 and the other end of resistor 275 is connected in series with resistor 277 to the remaining end of secondary 279. Resistor 280 of the voltage dividing potentiometer 278 is connected across slider 274 and a center tap of secondary winding 279. Slider 274 is adjusted along resistor 275 in either direction from the midpoint thereof in accordance with craft heading changes by a suitable operating connection 282 extending from operating means 143 connected to directional gyroscope 142. The extent of movement of slider 274 depends upon the magnitude of change in heading while the heading is being stabilized. A conductor 283 extends from slider 269 to the center tap of secondary 279.

Signal generator 285 comprises a potentiometer having a slider 286 and a resistor 287; a variable resistor 288; a fixed resistor 289; a secondary winding 290 of transformer 27; and a voltage dividing potentiometer 291 having a slider 292 and a resistor 293. One end of resistor 287 is connected in series with variable resistor 288 to one end of secondary winding 290. The other end of resistor 287 is connected through fixed resistor 289 to the remaining end of secondary winding 290. Resistor 293 of the voltage dividing potentiometer 291 is connected across a center tap of secondary winding 290 and slider 286. Slider 286 is positioned along resistor 287 by a yaw reset signal generator 294 the movement being effected by a suitable operating connection 295. Since the details of the reset signal generator 294 are unnecessary for an understanding of the present invention and are not to be claimed herein, reference is made to my prior application for more full disclosure thereof. A conductor 296 extends from the center tap of secondary winding 290 to slider 281 of the voltage dividing potentiometer 278.

Signal generator 298 comprises a left rudder rebalancing potentiometer having a slider 299 and resistor 300; fixed resistors 301, 302; a right rudder rebalancing potentiometer having a slider 303 and resistor 304; and a voltage dividing potentiometer 306 having a slider 307 and a resistor 308. Resistors 300, 301 are connected in series and the combination is connected across the secondary winding 305; resistors 302, 303 are connected in series and this combination is similarly connected across the secondary winding 305. Resistor 308 of the voltage dividing potentiometer 306 is connected across sliders 299, 303. Slider 299 is positioned along resistor 300 in accordance with the movements of the left rudder servomotor by a suitable operating connection 310, 220. Slider 303 is positioned along resistor 304 in accordance with the movements of the right rudder servomotor by a suitable operating connection 311, 211. A conductor 309 extends from slider 292 of voltage dividing potentiometer 291 to slider 299.

Reference is made to Figure 2a for the remaining portion of the input control network for rudder amplifier 256. This remaining portion of the control circuit comprises a turn coordination potentiometer 310, heading reset signal generator 152, and the manual turn control network 164. Turn coordination potentiometer 310 comprises a slider 311 and resistor 312. Resistor 312 is connected across a center tap of secondary winding 136 of signal generator 130 and terminal 151. Slider 311 is manually adjusted along resistor 312. A conductor 313 extends from slider 311 to slider 307 of the voltage divider 306 in signal generator 298. The signal generators 152 and 164 have been previously described in connection with the aileron control network 124.

The left rudder servomotor 204 in addition to operating the arm of single pole single throw switch 235 and the slider 299 of the network 298 additionally through a further operating connection 314 adjusts slider 46 in the signal generator 21. Similarly the right rudder servomotor 203 in addition to positioning the arm of single throw switch 238 and the follow-up slider 303 of signal generator 298 through a further operating connection 315 operates slider 43 in network 21. The movements of sliders 46 and 43 along their respective resistors 45, 44 are in accordance with the movements of the rudder servomotors associated therewith and thus the movement of slider 43 or 46 is in accordance with the operation of its rudder. In view of the fact that a rudder merely moves from closed to open position the follow-up sliders 299, 303 as well as sliders 43 and 46 are positioned at one extremity of their respective resistors with the rudders closed. Operation of its associated rudder from closed toward open position causes the movements of these sliders away from the end position on their resistors.

*Operation*

In operation, the aircraft control surfaces are generally directly manually controlled until the craft has attained a desired heading and attitude. If automatic control be thereafter desirable, a single pole single throw switch 317 may be operated. Closing of switch 317 effects energization of the magnetic clutches 210, 218 of the rudder servomotors 203, 204 from battery 236 through conductors 320, 321, 322; switch 317, to conductor 323 and thence in parallel, clutch 218, conductor 221 or conductor 324, clutch 210, conductor 213, to ground and return to battery ground 325 whereby the rudders of the aircraft are connected to their respective servomotors and held in braked or locked position while the servomotors are deenergized. Similar magnetic clutches may also be provided for the elevon servomotors 10, 11 and simultaneously energized. Closing of the switch 317 also energizes the rudder engage relays 242, 247 from closed switch arm 317, conductor 326 thence in parallel both relays. The elevon engage relays 12, 13 likewise may be concurrently energized from switch 317. Thus, the control surfaces are engaged with their respective servomotors, and the servomotor windings in turn may be energized from D. C. source 236 through the amplifier relays.

With the automatic steering mechanism engaged with the control surfaces of the aircraft the craft is stabilized about the pitch, roll, and vertical axes. Should the craft tilt about the pitch axis from its stabilized attitude, the vertical gyroscope 36 operates slider 24 so that the elevator network 20 becomes electrically unbalanced. A voltage signal is therefore applied to the respective amplifiers 14, 15 resulting in the operation of the elevon servomotors 10 and 11. The servomotors in addition to positioning their elevons in the same direction operate their follow-up sliders 89, 104 to proportion the movements of their respective elevons in accordance with the amount of change in pitch attitude. As the craft returns towards its normal attitude, slider 24 is moved toward its normal position on resistor 25. This reverse movement of slider 24 decreases the unbalance of network 20 and decreases therefore the signal voltage between terminal 87 and terminals 42, 85. This causes opposite unbalance voltage signals on amplifiers resulting in the reverse operation of the elevon servomotors to return their elevons to normal position.

Should the craft tilt about its roll or longitudinal axis, the vertical gyroscope 36 through its operating connection 37 adjusts slider 30 of the up-elevator potentiometer and slider 140 of the craft bank attitude potentiometer 139. The movement of slider 140 generates a signal between slider 140 and the center tap of secondary winding 136 which is applied across the voltage divider 182 of network 124. A portion of this voltage is selected by slider 184 and applied equally to elevon amplifiers 14 and 15. This control signal being of the same phase on each amplifier through a cross connection causes the servomotors 10 and 11 to position their elevon control surfaces in opposite directions. This movement of the control surfaces tends to restore the craft to its original attitude about the roll axis. As before, movement of the craft back toward normal moves the slider 140 back toward its normal position until the elevons are again in normal position with the normal attitude about the roll axis resumed.

In view of the fact that the elevon which is positioned downwardly tends to create a drag on the craft which would tend to cause it to change its heading with respect to the vertical axis, a signal from the bank attitude potentiometer 139 is also applied through the voltage divider 310 and conductor 313 to the rudder network 258. Thus, with the right elevon lowered, the left rudder would be operated toward open position to offset the tendency of the craft to change heading toward the right about the vertical axis.

Since a craft in a banked attitude tends to lose altitude, the slider 30 is positioned along resistor 31 in accordance with changes in attitude of the craft about the roll axis. This movement of slider 30 unbalances the elevator network 20 causing both elevons to be moved upwardly in proportion to the up-elevator signal. The subsequent position of both elevons in the same direction prevents loss of altitude of the craft while banked.

If the craft changes heading, while under stabilized flight, the directional gyroscope 142 operates slider 132 of the aileron network 124 and also operates slider 274 in the rudder network 258 whereby the elevons and a rudder are operated to place the craft in a banked turn. As the craft banks, the vertical gyroscope 36 applies an up-elevator signal by positioning slider 30 in signal generator 22 and also generates a signal in network 124 by the adjustment of slider 140 to return the elevons toward normal position. A portion of the signal obtained from movement of slider 140 is introduced into the rudder network 258 by voltage divider 310 tending to move the operated rudder toward its closed position.

When the craft has attained its maximum bank, it is in the steady state portion of the turn. The portion of the turn up to the point when the steady state is attained is known as the entry into the turn. During the entry of the craft into the turn, the craft unless prevented would tend to gain altitude. This gain in altitude during entry into the turn is due to the different effects produced by the upper and lower portions of the operated rudder such as portions 195, 196 of the rudder shown in Figure 2b or corresponding parts of the other rudder not shown. While it was intended that the upper and lower portions of rudder being displaced angularly in equal amounts would have equal but opposing effects about the pitch axis and thus merely increase the drag of the wing, it appears that actually the upper portion of the rudder has a greater effect than the lower portion with respect to the moment about the pitch axis of the craft and causes the craft to gain in altitude.

In order to prevent this gain in altitude during entry into the turn due to a displaced rudder, the operated rudder servomotor will position slider 43 or slider 46 in network 21. Displacement of either slider 43 or 46 will result in a voltage signal across conductors 53 and 54 which is of the same phase irrespective of which slider is moved. This voltage between conductors 53, 54 is provided in elevator network 20 and serves to effect movement of the elevons downward. This downward operation of the elevons due to the position assumed by the operated rudder offsets the tendency of the craft to gain altitude during entry into the turn. As soon as the craft is in the steady state portion of the turn, the rudder is closed and the down elevon voltage is removed. Thus, the down elevon signal from network 21 prevents gain in altitude during entry into the turn and the up elevon signal due to movement of slider 30 of the up-elevator network 22 serves to maintain altitude of the aircraft during the steady state portion of the turn.

The operation for heading changes by means of the manual turn control networks 169 and 173 is similar to that described for heading changes from the directional gyroscope 142 in that aileron action of the elevons and operation of a rudder causes entry into a turn. During this entry, the vertical gyroscope functions to return the elevons and rudder toward unoperated position and also functions to apply up-elevon. The operated servo functions to provide a down elevon effect. The directional gyroscope is conventionally rendered ineffective to oppose the manual change in heading. In the steady state part of the turn, the servo position effect is removed but the vertical gyroscope up-elevon effect continues. On recovery from the turn in order to follow a selected heading, the servo position on the elevons is again introduced.

It will now be apparent that there has been provided an improvement in an automatic steering apparatus for a Flying Wing aircraft which maintains the altitude of such craft during banked turns and this is achieved by providing, as it goes into the banked turn, a down elevon effect in proportion to rudder operation during this entry into the turn but which effect is withdrawn during the steady state portion of the turn when the rudder is returned to unoperated position. Thereafter, in the steady state portion of the banked turn, the elevons provide an up-elevator effect in proportion to the bank attitude to compensate for the decreased vertical lift of the craft which would otherwise cause it to loose altitude. It is also evident that this effect of down elevons is also applied during recovery from the turn when the opposite rudder is positioned as the craft assumes a new heading.

While but one embodiment of the invention has been disclosed, it will now be appreciated that it may assume other constructions; therefore, it is desired that the invention be not restricted to the specific form used for illustrative purposes but as defined by the accompanying claims.

I claim as my invention:

1. Control apparatus for an aircraft having a first control surface arranged in a wing of said craft that produces a moment about the craft vertical and pitch axes when displaced from a normal position and a second and third control surface arranged in the wings of said craft and producing jointly a moment about the craft roll axis when said second and third surfaces are positioned in opposite directions from a normal position and jointly producing a moment about the craft pitch axis when said surfaces are positioned in the same direction from a normal position; said apparatus comprising a first control means adapted for operating said first surface; a second control means adapted for operating said second and third surfaces; heading change detecting signal means connected to both control means for operating both control means to effect operation of said three surfaces to place said craft in a banked turn; and signal means displaced with said first surface and connected to said second control means for further operating said second control means to effect movement of said second and third surfaces to produce a moment about the pitch axis opposing the moment about this axis of said first surface.

2. The apparatus of claim 1 with follow-up means driven with each control surface and effective on its corresponding control means to provide a proportional movement to each said surface.

3. The apparatus of claim 2 with means responsive to the banked attitude of said aircraft and operating on said first and second control means to cause return movement of said first, second, and third control surfaces to limit the bank of said aircraft to the extent of operation of said heading change means.

4. Control apparatus for an aircraft having a first control surface arranged in a wing that produces a moment about the craft vertical and pitch axes and a second and third control surface arranged in the wings of said craft and jointly producing a moment about the craft roll axis when said second and third surfaces are positioned in opposite directions and jointly producing a moment about the craft pitch axis when said surfaces are positioned in the same direction; said apparatus comprising a first balanceable control means for operating said first surface; a second balanceable control means for operating said second and third surfaces; means responsive to change in heading of said craft adapted for operating both balanceable control means to place said craft in a banked turn; follow-up means operated by said surfaces and operating on said coresponding control means to limit operation of said first, second, and third surfaces in proportion to said change in heading; means responsive to banked attitude of said craft adapted for operating said first and second control means to effect return movement of said operated control surfaces toward unoperated position; and further means operated in accordance with displacement of said first surface and operating said second balanceable control means to effect operation of said second and third surfaces to produce a moment opposing a moment of said first surface about the pitch axis.

5. Control apparatus for an aircraft having two pairs of control surfaces arranged in the trailing edge of the wings of said craft, said apparatus comprising: motor means for projecting one control surface of one of said pairs so as to receive on said surface an impact of the air stream and thus derive a moment tending to rotate said craft about its vertical axis and also about its pitch axis; signal means responsive to the displacement of said one surface; control means operated by said signal means; and motor means operated by said control means for moving the other pair of control surfaces in the same direction to receive the impact of the air stream thereon and thus apply a moment to said craft about said pitch axis which opposes the moment of said one surface about said pitch axis.

6. Control apparatus for an aircraft having elevon control surfaces operable in the same or opposite directions and rudder control surfaces, said apparatus comprising: stabilizing means connected to said elevon and rudder surfaces for stabilizing said aircraft about the vertical, bank, and pitch axes; manually operable turn control means cooperating with such stabilizing means for initiating a turn by operating a rudder and adjusting the bank angle of said aircraft by positioning said elevons in opposite directions; such turn control means coacting with such stabilizing means for adjusting the pitch attitude of said aircraft; and further means responsive to positioning of said rudder surface and operable through said pitch control means to effect operation of said elevons in the same direction to oppose the change in pitch attitude of said craft occasioned by the displacement of the rudder surface.

7. Control apparatus for an aircraft having a first control surface arranged in a wing of said craft that produces a moment about the craft vertical and pitch axes and a second and third control surface arranged in the wings of said craft and producing a moment about the craft roll axis when said second and third surfaces are positioned in opposite directions and producing a moment about the craft pitch axis when positioned in the same direction, said apparatus comprising a first control means for operating said first surface; a second control means for operating said second and third surfaces; heading responsive means for operating both control means to effect operation of said first surface and to effect operation of said second and third surfaces in opposite direction to place said craft in a banked turn; position maintaining means responsive to the bank of said craft and operating said first and second control means to effect movement of said first surface and said second and third surfaces to their unoperated position; and means effective during operation of said first surface for operating said second control means to cause rotation of said second and third surfaces in the same direction to produce a moment opposing the moment of said first surface about the pitch axis.

8. In control apparatus for an aircraft having a rudder control surface exerting a moment about the vertical and pitch axes of the aircraft and elevon control surfaces operable in the same direction to exert a moment about the pitch axis of said craft and operable in opposite directions to effect a moment about the roll axis of the aircraft, in combination: adjustable means adapted for operating the rudder for causing a turn of the aircraft at some selected rate; adjustable means adapted for operating the elevons in opposite directions for causing a bank of the craft; manual control means having connections for simultaneously operating both adjustable means; and means operated in proportion to the displacement of said rudder and having connections to the elevon operating means for operating both elevon control surfaces in the same direction to apply a moment about the pitch axis opposing a moment of the operated rudder about said pitch axis.

9. Control apparatus for an aircraft having control surfaces for causing turning of the craft about the vertical axis and control surfaces operable in opposite or the same direction for alternatively causing rotation of the craft about the bank and pitch axes, in combination: first means for operating said first named surfaces for causing a turn of the craft at a selected rate; second means for operating the second named surfaces in opposite directions for causing a bank of the aircraft; means for resetting simultaneously both operating means; and further means responsive to the operated position of said first named surfaces for operating said last named surfaces in the same direction to oppose the turning effect about the pitch axis of the operated first surfaces.

10. Control apparatus for an aircraft having a first control surface exerting; when displaced from a normal position a moment about the vertical and pitch axes of the aircraft and second control surfaces for exerting when displaced from a normal position a moment about the pitch axis when operated in the same direction, in combination: servo means for operating the first control surface; servo means for operating the second control surfaces; a heading responsive device adapted on change in craft heading for controlling the operating means for said first control surface; and means responsive to operation of said first control surface for controlling the operating means for the second control surfaces to displace the second control surfaces whereby they exert an opposing moment to the first control surface about the pitch axis.

11. Control apparatus for an aircraft having two sets of control surfaces, one set causing the craft to move about one of its axes, the other causing the craft to move about an axis perpendicular to said one axis; a motor means for positioning the one set of control surfaces; a motor means for positioning the other set of control surfaces; means for controlling the first motor means to cause said craft to change heading; and means responsive to the extent of operation of the first motor means for controlling the extent of operation of the second motor means.

No references cited.